United States Patent [19]

Ghose

[11] 4,325,141

[45] Apr. 13, 1982

[54] INTERCONTINENTAL AIR TO AIR COMMUNICATIONS BY AN OPTIMUM MODE

[76] Inventor: Rabindra N. Ghose, 8167 Mulholland Ter., Los Angeles, Calif. 90046

[21] Appl. No.: 835,513

[22] Filed: Sep. 22, 1977

[51] Int. Cl.³ .............................................. H04B 1/12
[52] U.S. Cl. ...................................... 455/63; 455/98; 455/89; 455/276; 455/278; 343/705
[58] Field of Search ................ 325/65, 115, 377, 379, 325/473; 343/705, 706, 707, 708, 866, 18 E; 455/98–100, 128, 129, 276, 278, 297, 345, 63

[56] References Cited

U.S. PATENT DOCUMENTS

| | | | |
|---|---|---|---|
| 1,828,672 | 10/1931 | McFadin | 325/115 |
| 2,947,987 | 8/1960 | Dodington | 343/708 |
| 3,496,567 | 2/1970 | Held | 343/707 |
| 3,532,805 | 10/1970 | Rogers | 343/705 |
| 3,560,982 | 2/1971 | Fenwick | 343/707 |
| 3,806,944 | 4/1974 | Bickel | 343/707 |
| 3,823,403 | 7/1974 | Walter et al. | 343/708 |

OTHER PUBLICATIONS

*Wireless Telegraphy*, 1913, p. 121.

Primary Examiner—Howard A. Birmiel
Attorney, Agent, or Firm—Wagner & Bachand

[57] ABSTRACT

A low frequency air-to-air and air-to-ground communication system is described. The propagation characteristics of low frequencies and very low frequencies are such that less signal attenuation is encountered at intercontinental ranges when the system is operating in the TE mode as compared to the TM mode. The TE mode is defined as having a dominant vertical magnetic field component and the TM mode is defined as having a dominant vertical electric field. Also, the receiver in an aircraft is subjected to less ambient noise when it is positioned to receive the TE mode. However, ground transmitters are inefficient at transmitting and receiving the TE mode because the ground image tends to cancel out the transmitted and received signals. The apparatus described herein comprises a transmitter and receiver having horizontal electric current loop or linear horizontal antennas to generate and receive TE mode transmissions, said antenna being mounted on aircraft at an altitude of at least one quarter of a wave length above the earth's surface to enable efficient transmission and reception. A noise cancelling circuit for removing undesired signals at the receiver is also described.

7 Claims, 4 Drawing Figures

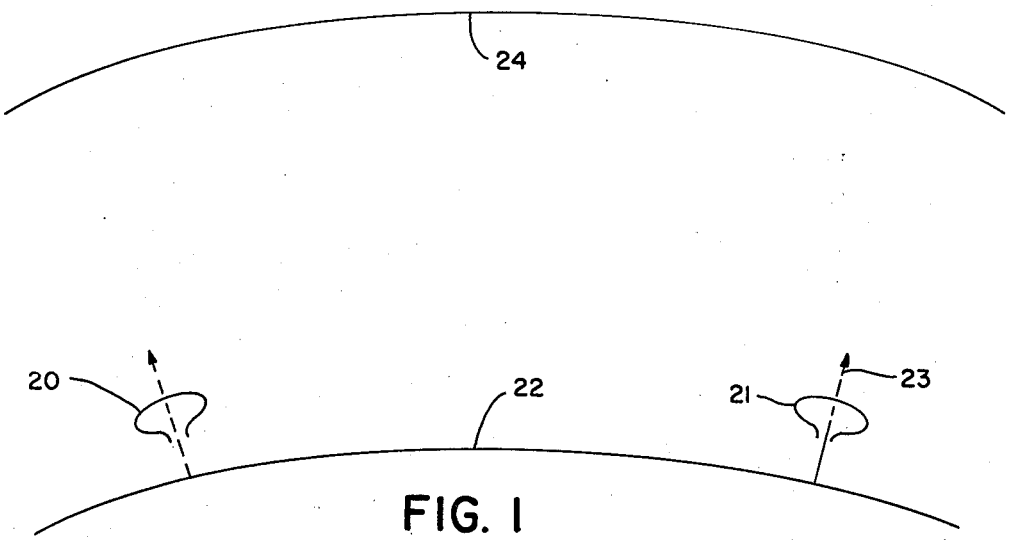
FIG. 1
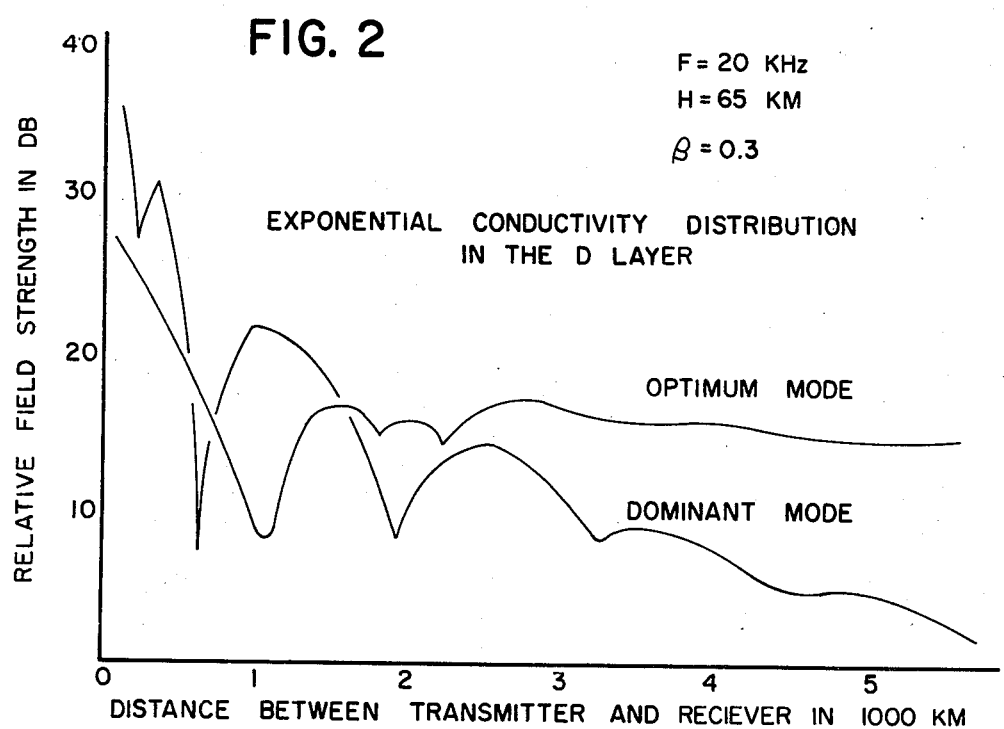

INTERCONTINENTAL AIR TO AIR COMMUNICATIONS BY AN OPTIMUM MODE

BACKGROUND OF THE INVENTION

For long range communications utilizing low frequency (LF) and very low frequency (VLF) transmissions, both for point-to-point and relay communications, one of two basic radiated field propagation modes may be used, the TM mode with a dominant vertical electric field component, and the TE mode with a dominant vertical magnetic field component.

Based on theoretical analysis and measured data on VLF propagation characteristics, the TE mode is particularly well suited to low frequency transmission because of its lower average attenuation rate of a fraction of a db per one thousand kilometers over the entire frequency range as compared to two to three db per thousand kilometers for the TM mode. Furthermore, the TM mode attenuation is highly variable, being affected by the effective ionospheric height, among others. The attenuation rate for the TE mode is fairly stable for these conditions.

In the case where the ionosphere is depressed by a high altitude nuclear detonation, the degradation of transmission in the TM mode is more severe than the worst case of a non-nuclear environment, while the change in the attenuation rate for the TM mode appears to be only nominal.

However, transmission of LF and VLF frequencies in the TE mode is difficult to achieve since the field radiated from a source close to the earth's surface consists predominantly of TM modes regardless of the excitation source. More specifically, in the "wave guide" defined by the earth and ionosphere, both vertical and horizontal dipole antennas, located close to the earth's surface, radiate essentially TM modes at any reasonable distance away from the source. When the antenna is a loop antenna with its plane parallel to the earth's surface, the image of the antenna virtually cancels the field radiated from it. Such a transmission, therefore, is extremely inefficient.

From the above, it can be seen that the TE mode is desirable for its transmission characteristics, and that an improved means for transmitting and receiving in this mode is required for reliable communication, especially during a national emergency.

SUMMARY OF THE INVENTION

The inventive apparatus described herein comprises a transmitting antenna and receiving antenna carried to altitudes of at least a quarter of a wavelength at the operating frequency. These antennas must be capable of transmitting, (or receiving) in the TE mode, and may conveniently be arranged as horizontal electric current loops or linear horizontal antennas which also radiate and receive TE mode. For optimum performance, there should be no deviation from horizontal for the antennas and in one embodiment, aircraft pitch and roll are controlled by an automatic sensor system to maintain the antenna angular position. Alternately, the antenna's angular position may be servoed to maintain the antenna orientation regardless of the orientation of the aircraft.

For guided wave propagation, which is an approximation for LF and VLF transmissions in the earth-ionosphere space, there are an almost infinitely large number of modes generated at or near the source, the transmitting antenna. Among these modes, assuming a horizontal loop antenna, is the principal TE mode which has a relatively low attenuation rate.

The attenuation for a propagating mode is due essentially to the losses of signals at the boundary walls of the waveguide, in this case the earth and the ionospheric surfaces. Since the conductivity of the ionospheric surface is considerably less than that of the earth's surface, the losses are primarily due to the ionospheric surface. More particularly, losses occur at the point where there is a low conductivity surface and a tangential electric field. The solution to the attenuation problem, then, is to generate a mode where the tangential component of the electric field at the ionospheric, and to a lesser extent, the earth surface is extremely small.

As explained above, this mode is not used for LF and VLF communications because it cannot be generated easily at a ground transmitter. The solution is to transmit and receive from aircraft. The result of this technique is that, for ranges of 10,000 Km, approximately one-hundredth of the attenuation rate in db/1000 Km is realizable requiring a transmitter power significantly lower than what is normally required for any given propagation path and signal to noise ratio (S/N).

This optimum mode has the added advantage that ambient atmospheric noise received along with the vertical component of the transmitted magnetic field is several db lower than that received with the vertical component of a corresponding transmitted electric field. Measurements of this noise field indicate that the vertical magnetic field noise of atmospheric origin could be as much as 20 db below the level of the noise corresponding to the vertical electric field. Alternatively the transmitted power could be reduced by a factor of one hundred to achieve the same S/N.

Another advantage of optimum mode communication is that it is relatively insensitive with respect to ionospheric variation during the day and night, and after nuclear detonation in the upper atmosphere. Also, from some test data it appears that noise immunity from atmosphere lightning discharges is increased since lightning has a predominantly strong vertical electric component.

Another advantage of this communication system is that it provides jam resistance since a ground based jamming transmitter cannot effectively interfere with signal reception. This is true since, as explained above, a ground based antenna cannot effectively transmit the optimum mode. The jammer could be airborne, However, in that case, the available jamming power would be substantially less than that which could be generated on the ground.

BRIEF DESCRIPTION OF THE DRAWINGS

FIG. 1 is a simplified schematic arrangement of an LF or VLF communication system;

FIG. 2 is a comparison of optimum and dominant mode field strength as a function of distance;

DETAILED DESCRIPTION OF THE INVENTION

FIG. 1 is a schematic diagram showing the spatial relationships between the communications systems elements. The upper and lower waveguide surfaces are the D or E layer of the ionosphere 24, and the earth's surface 22, respectively. The transmitter 20 and receiver 21 antennas are longitudinal loops located at least one quarter of a wavelength above the earth's surface 22. Given these elements, the dominant mode will be the optimum mode comprising a vertical magnetic field line 23.

A numerical example of the superior performance obtainable through the use of optimum mode transmission is shown in FIG. 2 which is a comparison of normal daytime propagation characteristics of optimum (vertical H) and dominant (vertical E) modes as measured in an earth ionosphere model. The optimum mode, corresponding to a dominant vertical component of the magnetic field, is characterized by a low attenuation rate and by a lesser sensitivity of the ionospheric conductivity and height.

As it appears in this figure, the field attenuates in the diffraction zone essentially in inverse proportion to the square root of the distance and the exponential range attenuation is extremely small. Since a field distribution, corresponding to 1/p, p being the propagation distance, is typical for a guided wave propagation with perfectly conducting guide walls, the attenuation rate for the optimum mode appears to be insensitive to earth and ionospheric conductivities.

A horizontal electric dipole or monopole at a sufficient altitude above the earth's surface generates a transmission which can be considered to consist of a sum of TE and TM modes. However, at long distances, the TM mode attenuates away, so that the essential field contribution from a LF or VLF radiating source at intercontinental distances will be TE modes only.

Since TM modes do not contribute usable power, it is desirable to radiate the total available energy in the TE mode. This requires an airborne longitudinal electric current loop for transmitting antenna in the form of a trailing wire antenna. This configuration does not optimally utilize all of the available power from the transmitter although a compromise is sometimes necessary to allow transmission (or reception) from an aircraft so as to provide some decoupling between the transmitter and receiver antenna.

Figure 3:
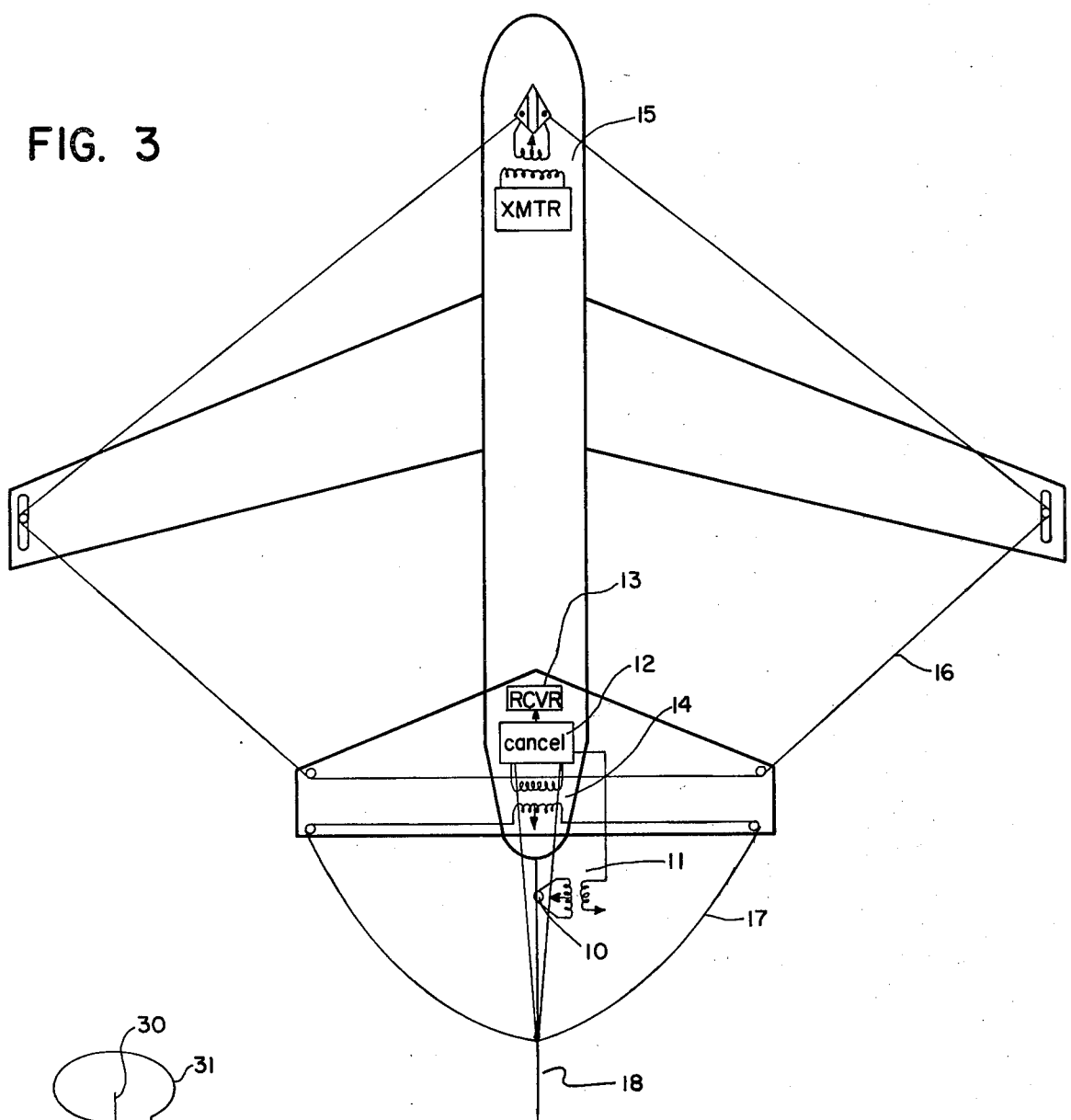
FIG. 3 is a layout of the antennas as mounted on an aircraft.

If duplex communication is desired, two horizontal loop antennas must be mounted on the aircraft, each capable of operating regardless of the orientation of the aircraft within its normal bounds of operating conditions. The preferred embodiment will be what is shown in FIG. 3 where the transmitter loop 16 comprises an antenna connecting the aircraft nose, wingtips and tail, and where the receiver loop 17 is a wire antenna trailing the aircraft tail. The decoupling between a transmitter and receiver antenna may be provided by an interference suppression system.

The aircraft should be limited to level flight during periods of transmission and reception to prevent system deterioration due to atmospheric noise corresponding to the vertical component of the electric field. However, in order not to compromise the maneuverability of the aircraft, an active, adaptive system is provided such that the noise corresponding to the vertical electrical field component is eliminated from the signal at the receiver. One element of this noise cancellation system is a vertical dipole 10 which is selectively sensitive to this vertical component. This noise can then be used as a reference in a noise cancellation system which will be described in more detail below.

As stated above, the antennas of FIG. 3 are not optimum with regard to matching the transmitter and receiver. Also, the locations and dimensions of the antennas in relation to the shape and size of the aircraft are such that irregular scattering from various regions of the aircraft structure result. However, the arrangement of the antennas, balanced as they are along the aircraft center line, minimize these effects. A long antenna at the tail end of the aircraft with its plane containing the center line or equivalent axis of the fuselage will receive the least scattered field. This is because the fuselage at low frequencies will have a scattering pattern similar to that of a short dipole with nulls in directions which coincide with the axis of the dipole. The contributions of scatterings from the wings and other protruded structural members of the aircraft, however, are not eliminated by the location of the loop antenna at the tail end of the aircraft. Since, for the optimum mode excitation, the scattering due to the wings is primarily due to the $\phi$ component electric field, the contribution of the magnetic field resulting from the wings which can be sensed by the loop antenna will be small, particularly when the aircraft is in a near horizontal position.

In addition to the location of the antenna, the effective signal received by it as a result of scattering will also be a function of the antenna dimension. Since the signal received by a loop antenna is proportional to the normal component of the magnetic field for the loop integrated over the loop area, a larger dimension of the loop will tend to smooth out the random fluctuations of scattering due to irregular aircraft structure and its orientation with respect to the field polarization. From the above, one may conclude that a loop antenna at the tail end of the aircraft with as large a dimension as is practical from the aerodynamic point of view will provide the best antenna configuration for the reception of optimum mode from an aircraft.

The noise received by a horizontal loop antenna is significantly smaller than that obtained by a vertical dipole for the same equivalent effective antenna area. When the orientation of the loop antenna is not absolutely horizontal, however, the antenna senses a fraction of the incident horizontal magnetic field, the fraction being the sine of the loop axis angle from the horizontal. In general, the value of noise contribution will be small for small values of aircraft roll when compared to the desired receiver signal. However, in the worst case, this dominant field can be orders of magnitude higher than the optimum field noise, compromising the communication system performance.

Figure 4:
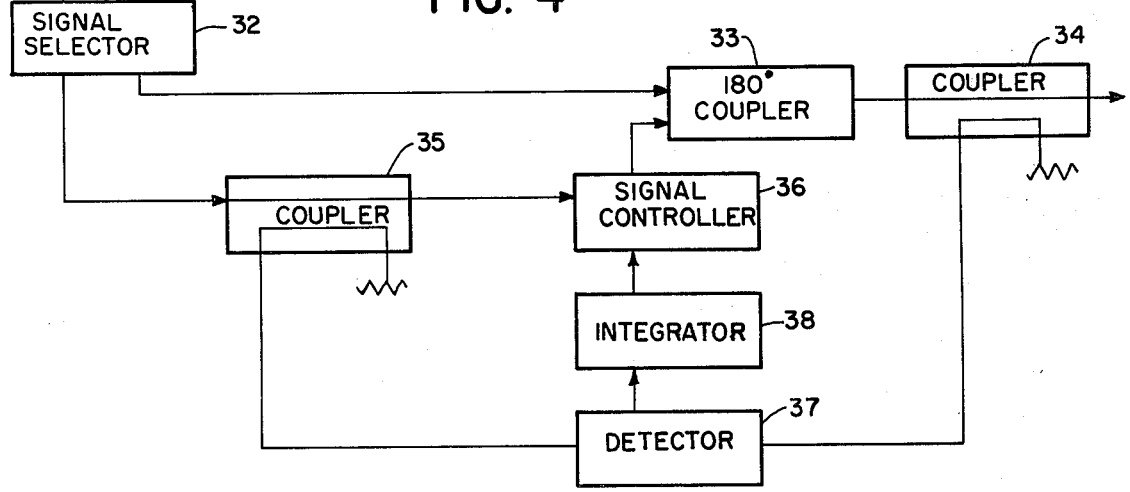
FIG. 4 is a schematic of the circuit required to suppress dominant mode noise.

The additional noise corresponding to the dominant mode, the mode with a dominant vertical electric field component, can be eliminated from the received signal by an active time domain network shown in FIG. 4. In this arrangement, the dominant electric field noise is sensed by a linear dipole antenna, shown as a dipole 30 in FIG. 4 and as a vertical dipole 10 in FIG. 3, which is parallel to the loop axis.

The loop antenna 31 of FIG. 4 receives the desired and undesired signals, the characteristics of these signals being significantly different. This does not mean that the frequencies are different, but only that those signals are uncorrelated. The dipole 30 also receives the same signals, although it receives them in a ratio different from that received by the loop antenna 31 in that a greater amount of undesired signal is received by said dipole 30. For given characteristics of these signals, the antennas and the aircraft, the undesired signal received at the loop will vary from that at the dipole by factors K and T where K is a function of amplitude and frequency and T is a function of delay. If, therefore, one may synthesize a network that could multiply the dipole output by the appropriate factors such as K and T and subtract the result from the loop output, a received signal free from the undesired noise could be produced. The circuit of FIG. 4 accomplishes this function.

The loop antenna 31 receives the desired signal and a portion of the undesired signal and outputs this sum to the signal selector 32 which selects and amplifies it. The signal selector output is then coupled through the 180 degree coupler 33, a summing junction and through the sampling coupler 34 to a receiver.

Simultaneously the dipole 30 receives a signal predominantly containing the undesired signal. This is also tuned and amplified in the signal selector 32 and is applied through the dipole coupler 35 to the signal controller 36 which adjusts the amplitude and delay so that the undesired signal output from the signal controller matches the undesired signal output of the loop antenna line of the signal selector 32. When these two outputs are then subtracted in the 180 degree coupler 33, a summing junction, the nominal output to the sampling coupler 34 is the desired signal, free of any undesired signal component.

To the extent that the signal transmitted to the receiver still has an undesired signal component, an automatic feedback loop is provided wherein a sample of the 180 degree coupler output 33, taken at the sampling coupler 34, and a sample of the dipole antenna 30 signal, taken at the dipole coupler 35, are coupled to the synchronous detector 37. Here these signals are compared to ascertain the extent of any correlation between these signals, the major correlation being caused by the incomplete cancelling of the undesired signal in the 180 degree coupler. To the extent that uncancelled noise remains, amplitude and delay factor error signals are generated and applied through appropriate amplifier integrators 38 to the signal controller 36 to more completely cancel the noise.

A signal controller capable of receiving an electrical communications signal, of either attenuating or amplifying it, and of varying the amount of delay between the controller input and output are old in the art. See, for instance, U.S. Pat. No. 4,016,516, commonly assigned, for a detailed description of a signal controller for this application, and which is incorporated by reference herein.

An example of apparatus for cancelling interference not identical to the desired signal in amplitude and phase is described in U.S. Pat. No. 3,716,863, commonly assigned, which is also incorporated by reference herein.

The physical location of these system components is shown in FIG. 3. The vertical dipole 10 is supported by a fiberglas boom extending from the aircraft tail and is coupled through a coupling transformer 11 to the noise cancelling circuit 12 and to the receiver 13. The receiving antenna 17 trailing the tail is likewise coupled through a coupling transformer 14 to the circuit 12. Another transformer 15 couples the transmitter to the transmitting antenna 16. In full duplex operation, the transmitter and receiver frequencies are separated to prevent interacting. Also, a device similar to the undesired signal cancelling arrangement may be seen for additional isolation or decoupling.

A winged aircraft is shown in FIG. 3 but it is to be understood that missiles or lighter than air vehicles such as baloons and blimps could also be used as transmit/receive platforms.

The specific advantage of the optimum mode can be utilized when a trailing wire antenna is used for the field excitation although the total available electromagnetic energy is not properly utilized in such an arrangement. To take advantage of the low noise characteristic, however, a loop receiving antenna which can selectively receive the field corresponding to the vertical component of the magnetic field must be employed. FIG. 3 shows the location of the trailing antenna 18 if used instead of the transmitting loop antenna 16. Although not shown, there would be an electrical connection between the trailing antenna 18 and the transmitter 15 if said trailing antenna were used.

The above described embodiments and methods are furnished as illustrations of the principles of this invention and are not intended to define the only embodiments possible in accordance with our teachings. Rather, protection under the U.S. Patent Law shall be afforded to us not only to the specific embodiments above, but to those falling within the spirit and terms of the invention as defined in the following claims.

What is claimed is:

1. A system for providing reliable low frequency and very low frequency radio communications over long distances comprising:
   a first platform at a transmitting station location, located approximately one quarter of a wavelength or more of the operating frequency of the system above the earth's surface;
   a communications transmitter mounted on said first platform;
   a first antenna coupled to said transmitter for transmitting said transmitter output substantially in the TE mode;
   a second platform at the receiving station location located approximately one quarter of a wavelength of the operating frequency of the system or more above the earth's surface;
   communications receiver means mounted on said second platform; and
   a second antenna coupled to said receiver for receiving said transmitter output and coupling it to said receiver, said second antenna adapted to receive transmissions in the TE mode;
   said first and second platforms constituting aircraft;
   said first antenna constituting a horizontal loop antenna supported by horizontally displaced portions of said aircraft; and
   said second antenna constituting a horizontal loop antenna trailing from opposite spaced horizontal portions of the tail surfaces of said aircraft.

2. The apparatus of claim 1 further comprising a vertical antenna mounted on said second platform for receiving a signals in the TM mode, and wherein said receiver means further comprises:
   (1) a signal controller for receiving the output of said vertical antenna and for generating therefrom a signal equal in amplitude and opposite in polarity to the signals received by said second loop antenna;
   (2) a summing junction for adding the output of said signal controller and the second antenna; and
   (3) a receiver for receiving the output of said summing junction.

3. The apparatus of claim 2 further comprising:

a first coupler for sampling the output of said vertical antenna;

a second coupler for sampling the output of said summing junction;

means for comparing the outputs of said first and second coupler to determine the phase and amplitude of the uncancelled undesired signal at said second coupler and to generate error signals proportional to the phase and amplitude of the undesired signal; and wherein said signal controller is responsive to said error signals to match said signal controller output to said undesired signal at said summing junction to more exactly cancel said undesired signal.

4. A communications system for providing low frequency and very low frequency communications of desired signals between a pair of stations, each station comprising:

an aircraft at an altitude approximately one quarter of a wavelength or more of an operating frequency of the system above the earth's surface;

a transmitter and receiver mounted in said aircraft;

a first horizontal loop antenna coupled to said transmitter;

a vertical antenna mounted on said aircraft for receiving undesired signals in the frequency range of operation of the system;

a second horizontal loop antenna mounted on said second aircraft station for receiving a desired signal, said second antenna also receiving said undesired signals;

a signal controller for varying the output of said vertical antenna to match the output and phase of the undesired signal components at the outputs of said signal controller and said second antenna;

a summing junction for subtracting the outputs of said signal controller and said second antenna;

a first coupler for sampling the output of said vertical antenna;

a second coupler for sampling the output of said summing junction;

a comparator for generating error signals proportional to the amount and phase of the uncancelled undesired signal at the output of said summing junction;

wherein said signal controller is responsive to said error signals to vary the amplitude and phase of said vertical antenna output to more closely match the amplitude and phase of the undesired signal from said second antenna; and a receiver for receiving the output of said summing junction.

5. The apparatus of claim 4 wherein said first horizontal loop antenna is mounted on said aircraft wings and said second horizontal loop is mounted from said aircraft tail.

6. The method of communicating at low frequency and very low frequencies comprising;

the steps of positioning first and second aircraft at an altitude of at least one quarter of a wavelength of the desired low or very low frequency of operation above the earth's surface;

transmitting from said first aircraft a low frequency or very low frequency communication on a transmitter antenna adapted to transmit in the TE mode;

receiving this transmission at the second aircraft on a horizontal antenna adapted to receive TE mode transmissions;

receiving at said second aircraft ambient noise signals on a vertical antenna adapted to receive TE mode signals;

varying the amplitude and phase of said ambient noise signal to match the noise received at said horizontal antenna;

subtracting the varied noise signal from the received transmission; and using said subtracted signal as the received signal at said second aircraft.

7. The method of claim 6 further comprising the steps of:

monitoring the input to said receiver for uncancelled noise; and varying the amplitude and phase of said ambient noise signal in response to the phase and amplitude of said uncancelled noise, thus closing the error loop to more nearly cancel the noise at said receiver.

* * * * *